April 6, 1965 H. W. ROBINSON 3,177,476

INFORMATION STORAGE APPARATUS UTILIZING A RECORD OF INTERNALLY REFLECTIVE, LIGHT CONDUCTING MATERIAL

Filed May 29, 1961 2 Sheets-Sheet 1

INVENTOR.
HOWARD W. ROBINSON
BY Morris L. Rabkin
ATTORNEY

April 6, 1965 H. W. ROBINSON 3,177,476

INFORMATION STORAGE APPARATUS UTILIZING A RECORD OF INTERNALLY REFLECTIVE, LIGHT CONDUCTING MATERIAL

Filed May 29, 1961 2 Sheets-Sheet 2

INVENTOR.
HOWARD W. ROBINSON

BY Morris A. Rabkin

ATTORNEY

United States Patent Office 3,177,476
Patented Apr. 6, 1965

3,177,476

INFORMATION STORAGE APPARATUS UTILIZING A RECORD OF INTERNALLY REFLECTIVE, LIGHT CONDUCTING MATERIAL

Howard W. Robinson, Bellmawr, N.J., assignor to Radio Corporation of America, a corporation of Delaware Filed May 29, 1961, Ser. No. 124,750
6 Claims. (Cl. 340—174.1)

The present invention relates to apparatus for storing information on a record, and more particularly to a system for identifying locations on the record at which different information items may be stored.

The invention is especially suitable for use in memory devices for electronic data processing apparatus. However, features of the invention are generally useful in the handling of recordable information in other types of apparatus.

The location of information recorded at different places on a record usually involves the use of a clock track. Pulses are recorded on the clock track in positions corresponding to the locations of different items of information recorded on the record. One or more signal transducing heads are used, in addition to the heads which are used for reading and writing information, to scan the clock track. Systems including the clock track recording and reproducing head or heads and their associated circuitry therefore add to the complexity and to the cost of data storage apparatus.

Accordingly, it is an object of the present invention to provide improved information storage apparatus in which the location of different items of information is facilitated at lower cost than was the case with systems of the prior art.

It is a further object of the present invention to provide an improved indexing system for different information storage locations on a record.

Briefly described, the invention may be incorporated in a record transport system utilizing a record constituted at least in part of internally reflective, light conducting material. The record may have a plurality of locations in which different items of information may be recorded (written) and from which different items of information may be reproduced (read). The light conducting material has an exposed portion which defines a track extending along the record. The track is marked so as to have one or more areas of different light transmissibility in positions corresponding to the locations of the different items of information on the record. A source of light is directed at the record. Light from the source is conducted through the light conducting material of the record and illuminates the track. An index station is disposed along the path of movement of the record and is exposed to illumination from the track. Light responsive means are disposed at the index station for distinguishing between light and dark areas of the track. Signals are generated by means controlled by the light responsive means at the index station. Signals, such as pulses, are generated in response to either the light or the dark areas of the track, and are used to identify the locations of the different items of information.

The invention itself, both as to its organization and method of operation, as well as additional objects and advantages thereof, will become more readily apparent from a reading of the following description in connection with the accompanying drawings, in which.

Figure 1:
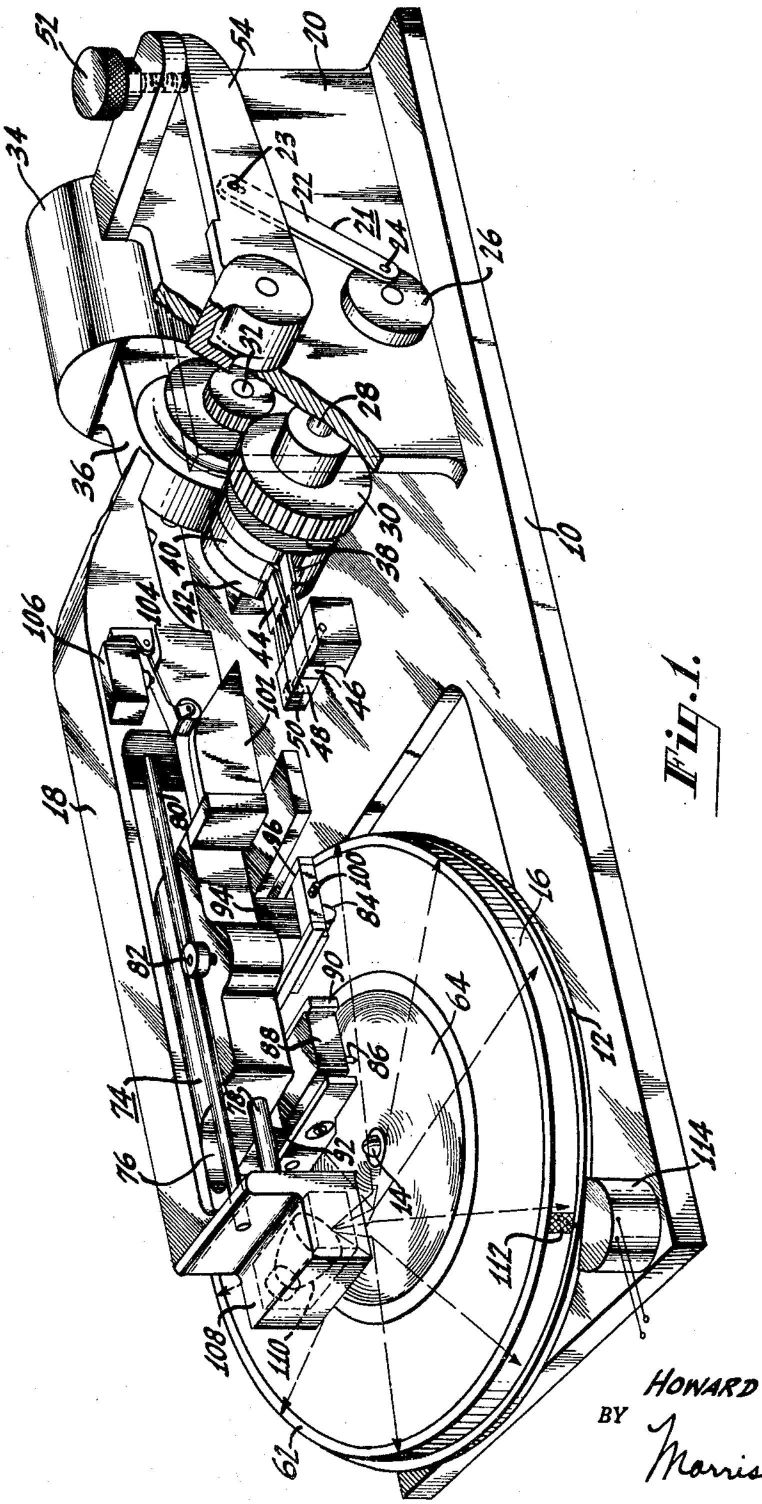
FIGURE 1 is a perspective view of a record transport and magnetic recording and reproducing system incorporating the invention.

Referring more particularly to FIG. 1, there is shown a deck plate 10 which supports the record transport. A turntable 12 is mounted on the plate 10 and is driven by a motor (not shown). A spindle 14 extends upwardly from the turntable. A magnetic disc record 16 is disposed on the turntable and is centered by the spindle 14. The disc record will be described in detail hereinafter in connection with FIG. 4.

A support member 20 extends vertically upwardly from the deck plate 10. A record tracking arm 18 is rotatably mounted on the support member 20. The arm 18 is one arm of a lever which may be raised and lowered by an eccentric drive mechanism 21. A crank arm 22 included in the eccentric drive mechanism, is pivotally secured by a pin 24 at an eccentric point on a drive wheel 26. A pin 23 extends from a rearwardly extending arm 54 of the lever through a slot in the crank arm 22.

The drive wheel 26 is mounted on a shaft 28. A spur gear 30, driven by another spur gear 32, rotates the shaft 28. The latter spur gear 32 is driven by an electric motor 34 through a reduction gear box 36. Three cams 38, 40 and 42 are mounted for rotation with the shaft 28. Follower arms 44 are actuated by the cams 38, 40 and 42. Switches 46, 48 and 50 are operated by the cam follower arms 44. The cams 38, 40 and 42 will actuate different ones of the switches 46, 48 and 50 depending upon the angular position of the shaft 28. The cam 38 is shaped so as to actuate the switch 46 when the tracking arm 18 is in its raised position. The cam 40 is shaped to actuate the switch 48 when the arm 18 is in its lowered position. The cam 42 actuates the switch 50 when the arm is in an intermediate position. The maximum descent of the tracking arm is limited by an adjustable stop 52 which engages the rearwardly extending arm 54.

Figure 4:
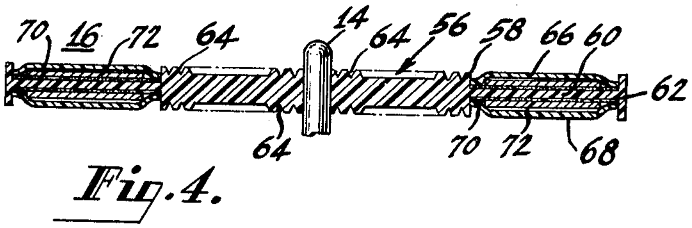
FIGURE 4 is a sectional view of a record of the type which may be used in the record transport shown in FIG. 1.

The magnetic disc record 16, shown in FIGS. 1 and 4, includes a disc 56 having a central hole which receives the spindle 14. The disc 56 also has a grooved hub 58, a web 60 and a rim 62. The disc is formed of a material which readily conducts light and which is capable of a high degree of internal reflection. Examples of materials which conduct light and which have a high optical index of refraction, and which are, therefore, suitable for the disc 56, are polycarbonate resins sold under the trade name of "Lexan" by General Electric Company of Schenectady, New York, and acrylic resins sold by E. I. du Pont de Nemours and Company of Wilmington, Delaware under the trade name "Lucite" and by Rohm and Haas Company of Philadelphia, Pennsylvania, under the trade name "Plexiglas." Materials of this sort can be either transparent or transluscent so long as they are light conductive and they have a substantially higher optical index of refraction than the ambient (i.e., air) whereby they are internally reflective. A disc 56 made of any of the above named or other materials of like optical properties has the characteristic of "trapping," so to speak, light which enters it, since the light passing thereinto will be substantially total reflected internally except at certain surfaces of the disc which are substantially perpendicular to the light rays as, for example, at the edge of the disc along the rim 62.

The hub 58 of the record 16 is formed with spiral grooves 64 on the opposite flat sides thereof. These grooves facilitate the entry of light into the disc 56, since they provide a greater surface area for receiving direct illumination. The grooved surface also provides good reception for indirect illumination. The record tracking arm 18 (FIG. 1) tracks in the grooves 64. Layers 70 of adhesive material are disposed on the opposite, flat sides of the web 60. Bodies 72 of resilient material, such as felt, paper or flock, are secured to the opposite sides of the web 60 by the adhesive layers 70. A pair of magnetic tape annuluses 66 and 68 are disposed over the bodies 72 of resilient material. The peripheral edges of the tape annuluses 66 and 68 are secured to the web by the adhesive layers 70. Annular pockets of air are formed between the tape annuluses 66 and 68 and the bodies 72 of resilient material. These pockets of air and the bodies 72 of resilient material serve as a cushion for a magnetic head. This type of record is more fully described in the copending application of E. A. Damerau and R. H. Jenkins, Serial No. 108,810, filed May 9, 1961, for "Information Storage Devices and Method of Making Same," and assigned to the same assignee as that of the present invention.

The tracking arm 18 has a record tracking assembly 74 which scans the record 16 for the purpose of recording spiral record tracks on the recording surface of the disc record 16. The record tracking assembly includes a slide 76 mounted on a rod 78. The slide 76 is stabilized by a stabilizing rod 80 which is engaged by a roller 82. The roller 82 is rotatably mounted on the top of the slide 76. The slide is over-balanced about the axis of the rod 78 so that the roller 82 is urged against the stabilizing rod 80. A stylus 86 is secured in a block 88. The block 88 is pivotally mounted in a bifurcated arm 90 which is pivotally mounted on a bracket 92 depending from the slide 76. The stylus adjusts itself in the groove by virtue of its pivotal mounting.

A magnetic head 84 is contained in a block 94. This block 94 is mounted in an arm 96. The block 94 is mounted on a pivot 100 for rotation about a transverse axis. The arm 96 is mounted in a manner similar to the stylus arm 90. Accordingly, the magnetic head is substantially universally movable over limited distances so that the head may orient itself in intimate contact with the magnetic recording surface of the record 16.

A cam plate 102 is mounted on the slide 76. This plate cooperates with an actuating arm 104 of a switch 106. The cam plate 102 is shaped so that the switch is actuated when the magnetic head 84 begins to track the beginning of the spiral record track on the disc record 16. This switch 106 therefore provides information as to the start of data reading and/or writing operations.

A housing 108 for a lamp 110 is provided on the free end of the arm 18. The electrical terminal connections to the lamp have been omitted from the drawing for the sake of simplicity. The lamp 110 and the housing are disposed directly over the grooves 64 in the hub 58 of the record 16. Accordingly, light rays from the lamp which are shown by the dashed lines in FIG. 1 are directed into the record through the hub portion thereof. As mentioned above, the angularly oriented faces of the grooves 64 facilitate the entry of the light rays into the disc 56 of internally reflective, light conductive material which constitutes the core of the record 16. These light rays experience multiple internal reflections and thereby travel generally in a lateral direction through the hub 58 and the web 60 to the rim 62 of the record. All light rays except those which are substantially perpendicular to the edge surface of the disc rim 62 are totally reflected, since the index of refraction of the disc is much greater than the index of refraction of the air or the layer 70 of adhesive material which covers the web 60. Only the edge of the record at the rim 62 is illuminated, since this edge is substantially perpendicular to the light rays from the lamp 110 which are trapped within the disc 56.

The edge of the rim 62 is marked by a spot 112. This spot or mark may be formed by opaque paint on, or an insert of opaque material in, the rim 62. The mark 112 serves to block the transmission of light through the marked area of the rim. An index station 114 is disposed adjacent the path of movement of the record rim and is exposed to illumination from the edge of the rim 62. The marked rim constitutes a track along the record edge which parallels the record track which is recorded thereon. A single spiral record track or a plurality of such tracks may be recorded using a plurality of heads.

In operation, as the turntable 12 rotates the record 16, a force radially inward of the record is applied to the guiding stylus 86. Since the stylus 86 and the head 84 are mounted on a common support, namely, the slide 76, the head 84 follows the stylus 86 and track the spiral record track on the magnetic recording surface of the record. For example, twenty spirals may be recorded at different radial distances from the center of the record. Each turn of the spiral track extends 360° around the record and corresponds to one revolution thereof. Different items of information constituting a block of information may be recorded on pairs of successive tracks. In other words, a block of information may be recorded around 720° or two revolutions of the record. Blocks of information items may be located on separate successive turns, if desired. In either case, the location of the different items of information corresponds to the number of rotations of the record 16. The mark 112 on the illuminated edge of the disc will pass the index station 114 once for each rotation or turn of the record. The mark 112 is disposed in position to correspond to the beginning of each turn. Accordingly, the mark 112 corresponds positionally with the locations (the turns of the record track) for the various items of information on the record. When the mark 112 passes the index station 114, the beginning of a turn is indicated. Means are disposed at the index station 114 which distinguish the light and dark areas of the illuminated edge of the record 16, and thereby detect the passage of the mark 112. In some instances, more than one mark 112 may be provided on the edge of the record disc.

Figure 2:
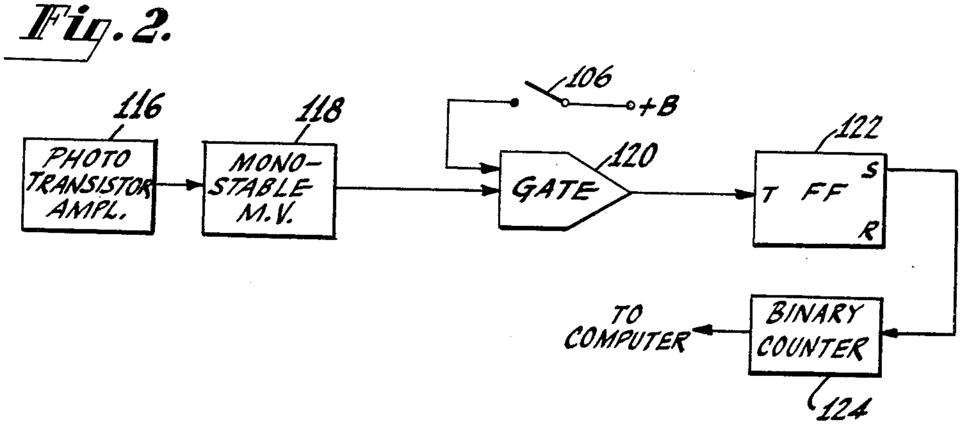
FIGURE 2 is a block diagram of a circuit associated with the system shown in FIG. 2.

Referring more particularly to FIG. 2, there is shown a photo-transistor amplifier 116 which is employed at the index station 114. This amplifier may include any suitable photo-transistor known in the art, such as a type 2N469 photo-transistor. This photo-transistor is responsive to the light and dark areas of the illuminated edge of the record 16. The amplifier including this photo-transistor may be a class A transistor amplifier of known design. This amplifier is biased to provide an output signal so long as the photo-transistor is illuminated. When the illumination to the photo-transistor is cut-off, as when the mark 112 passes the index station 114, the current through the photo-transistor is temporarily interrupted. Then, an output pulse of voltage, which is higher than the voltage normally provided at the output of the photo-transistor amplifier, is generated and is applied to a mono-stable multivibrator (one-shot) 118. A capacitive coupling may be used between the photo-transistor amplifier 116 and the mono-stable multivibrator 118 so that only the pulse corresponding to the marked area of the record edge will be applied to the multivibrator, and the slow variations in D.C. level will be blocked. The output of the multivibrator is a pulse of predetermined duration. The mono-stable multivibrator 118 is triggered by the leading edge of the pulse from the photo-transistor amplifier. Accordingly, the size of the mark 112 will not be critical and the pulse provided by the mono-stable multivibrator will be of a duration and shape substantially independent of the shape of the mark 112 and the shape of the pulse provided by the photo-transistor amplifier 116. It is also desirable that the multivibrator 118 have a predetermined threshold triggering level. Imperfections in the disc and foreign matter, which might modify the illumination of the edge of the record, may cause the output of the photo-transistor amplifier to vary somewhat, when areas other than the mark 112 pass the index station 114. Such noise or disc imperfection produced signal variations will not be of sufficient amplitude to trigger the mono-stable multivibrator 118.

The output of the multivibrator 118 is applied to an AND gate 120. Another input is connected to the AND gate 120 from a source of operating voltage through the switch 106. The AND gate 120 will be enabled only when the switch 106 is closed. It was pointed out in connection with FIG. 1 that the switch 106 is actuated only when the magnetic head is in record tracking position. In practice, it may be desirable to provide lead-in grooves for the stylus 86 and corresponding lead-in tracks for the head 84 which extend over one to three revolutions. The cam 102 actuates the switch 106 at the beginning of the first turn of the record track, or after the end of the lead-in tracks. Output pulses corresponding to the pulses generated by the mon-stable multivibrator 118 will be transmitted by the cam 120 only after the beginning of record tracking operation.

The pulses passed by the gate 120 are applied to the trigger input of a triggerable flip-flop 122. The flip-flop changes state for each pulse from the multivibrator 118. Only the "set" output of the flip-flop is used. This "set" output provides the same voltage level for every other, or every odd, pulse from the multivibrator 118. The output of the flip-flop 122 is applied to the input of a binary counter 124. This binary counter has a binary output which corresponds to the number of odd pulses from the multi-vibrator 118. The count is stored in the counter 124 and may be applied to user equipment such as an associated computer system. Read-write circuitry for reading from or writing on any block of the record track may be enabled at the proper instant to transfer information from any desired location on the record 10.

A block of information in the system illustration herein is contained in a pair of successive turns of the record track. It may be desired to write different blocks of information in individual turns. In the latter case, it will be desired to count each record track. Accordingly, the binary counter may respond directly to the output of the gate in the event that individual turns are counted. The binary counter is reset after all of the record tracks on the record are scanned. For example, the record 16 may have twenty record turns divided into ten blocks. The mark 112 will pass the index station at the beginning of each turn. The mono-stable multivibrator 118 will generate twenty pulses, each in time sequence. Each odd pulse will be counted by the binary counter 124. When ten pulses are counted, the binary counter will provide an output. This output will be fed back to reset all the counter stages to zero.

The record transport system shown in FIG. 1 is adapted to be associated with a record holder which contains a plurality of different records. Each of these records will be identical to the record 16. Record transfer means, such as disclosed in the Vanderzee et al. Patent No. 2,697,607, issued December 21, 1954, may be provided to transfer records selected at random to the turntable 12.

Figure 3:
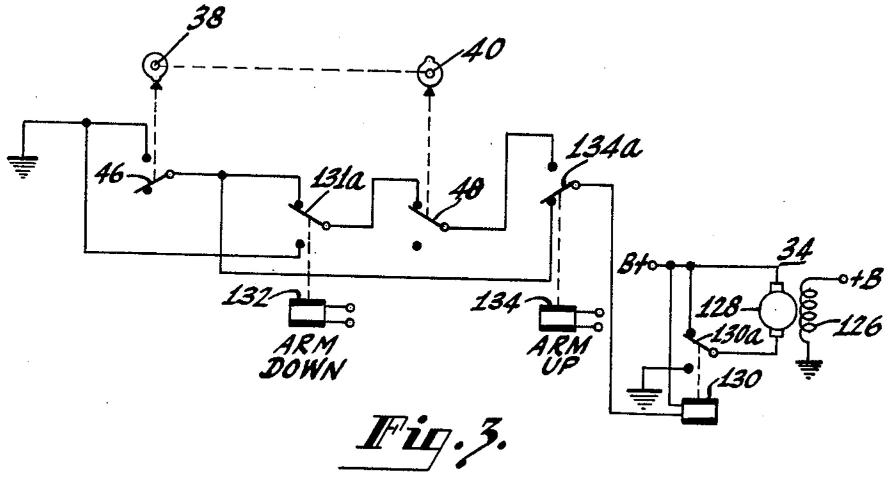
FIGURE 3 is a schematic diagram of a circuit for controlling a record tracking arm which is included in the record transport shown in FIG. 1.

A system is shown in FIG. 3 for controlling the raising and lowering of the arm 18 so that a record may be transferred from the turntable 12 to the basket and a new record placed on the turntable and scanned by the head 84. The cams 38, 40 and 42 are used in this system. However, for the purpose of simplifying the discussion and the circuitry involved, while adequately explaining the mode of operation of the invention, the cam 42 and its associated circuitry which responds to the intermediate position of the arm has been omitted in FIG. 3. The arm is raised and lowered by the motor 34. This motor may be a direct current motor having a field winding 126 and an armature 128. The motor is controlled by a relay 130. The contacts 130*a* of this relay are connected either to short circuit the armature 128 or to connect ground to the armature. In the latter case, armature current will flow and the motor will rotate. Motor rotation is unidirectional. The eccentric 26 and the crank arm 22 change the unidirectional motor rotation into reciprocating motion for moving the arm up and down. The circuit is shown in FIG. 3 with the switches in the positions assumed when the arm is raised to its maximum upper-most position. A relay 132 is energized when the arm is to be disposed in lowered position for scanning the record 16. Another relay 134 is energized when the arm is to be disposed in raised position. These relays 132 and 134 operate relay contacts 132*a* and 134*a*, respectively. The cam 38 operates the switch 46 only when the arm 18 is in raised position. The cam 40 operates the switch 48 when the arm 18 is in lowered position. Since the arm 18 is connected to the motor 34 through speed reduction gearing, the arm will remain in its assumed position when the motor 34 stops.

For the situation where the arm is raised, as shown in FIG. 3, a circuit from B+ to the motor control relay 130 is broken at the cam operated switch 46. The motor control relay 130 is therefore de-energized. The armature 128 is short-circuited and therefore dynamically braked. Accordingly, the arm remains in raised position until a command is received from a user equipment, such as a computer, directing the arm to move downwardly into position to scan the record 16. Upon such command from the computer, the relay 134 is de-energized and the relay 132 is energized. A circuit is completed to the motor control relay 130 through the contacts 134*a*, which drop-out, the cam switch 48 and the contacts 132*a*, which pull in, to ground. Current then flows through the armature 128 and the motor turns. The motor 34 continues to turn until the switch 48 is opened by the cam 40. The motor control relay 130 is then de-energized and its contacts 130*a* drop-out. The motor 34 is dynamically braked through the contacts 130*a* so that the arm remains in lowered position in scanning relationship with the record.

When the user equipment commands the arm to move to raised position, the relay 132 is de-energized and the relay 134 is energized. A circuit is then completed to the motor control relay 130 through relay contacts 134*a* and the cam switch 46. The motor turns until the cam switch 46 opens. When the motor stops due to electrodynamic braking, the arm 18 remains in raised position until another command is received from the computer to lower the arm.

From the foregoing description, it will be apparent that there has been provided an improved information storage apparatus having an improved indexing system for locating items of information which are stored in different locations on a record. While the invention has been described in connection with a disc record transport and handling system, it will be appreciated that features of the invention are useful with other types of record members. Variations in components of the illustrated system and in the system itself, all within the spirit of the present invention, will undoubtedly be apparent to those skilled in the art. Accordingly, the foregoing description should be considered as illustrative and not in any limiting sense.

What is claimed is:

1. In a record transport system in which a record travels along a path, said record being constituted at least in part of internally reflective, light conducting material having an exposed portion which defines a track extending along said record, said track having areas of different light transmitting properties, an indexing system which comprises an index station disposed along said path and exposed to illumination from said track, a source of light directed at said record for illuminating said material and thereby illuminating said track, means disposed at said index station for distinguishing between light and dark areas of said track, and signal generating means responsive to said light and dark area distinguishing means for generating a signal which varies in accordance with said light and dark areas.

2. In combination, a record having storage for a plurality of items of information at a plurality of discrete locations thereon, said record being constituted in part of a body of internally reflective, light conductive material, at least one portion of said body corresponding to said locations being marked so as to have different light transmissivity, means for directing light into said record, an indexing station located to be exposed to illumination from said portion, means for moving said record past said indexing station, and means for distinguishing between light and dark areas of said record portion which passes said indexing station.

3. In combination, a disc record having storage for a plurality of items of information at a plurality of locations spaced radially with respect to each other on said record, said record being constituted in part of a disc of internally reflective, light conductive material, the peripheral edge of said disc having at least one area thereof in a position corresponding to said locations marked to have different light transmission than the rest of said edge, means for directing light into said disc to illuminate said edge, an indexing station exposed to illumination from said edge, means for rotating said record so that said edge revolves past said indexing station, and means for distinguishing between the light and dark areas of said edge which pass said indexing station.

4. In combination, a disc record having a record track having a plurality of turns spaced radially from each other, said record also having a grooved hub and comprising a disc of internally reflective, light conductive material extending radially to the peripheral edge of said record, means for directing light into said hub to illuminate said edge, an index station located to be exposed to illumination from one edge, said edge having an area in a position corresponding to the start of each of said turns, through which the transmission of light is different than that through the rest of said edge, means for rotating said record so that said edge passes said index station, and means at said station for distinguishing between said light and dark areas of said edge which pass said index station.

5. In combination, a magnetic disc record which comprises a disc of internally reflective, light conductive material having an annulus of magnetic tape secured to the surface thereof, an arm, a magnetic head mounted on said arm for scanning successive spiral turns of a record track on said tape annulus, the edge of said disc being marked at a portion thereof in a manner to transmit light differently than that transmittable through the rest of said disc edge, a lamp on said arm for directing light into said disc whereby to illuminate said edge, an index station disposed adjacent to said edge, a turntable for rotating said record relative to said arm, and means at said index station for distinguishing between light and dark areas of said edge which pass said index station.

6. In magnetic recording and reproducing apparatus, the combination comprising a magnetic disc record including a disc of internally reflective, light conductive material, the edge of said record being marked at a portion thereof to change the transmission of light therethrough from that through the rest of said disc edge, a magnetic head for tracking a spiral record track on said record as said record rotates, means for rotating said record, means for directing light into said record for illuminating said edge thereof, and means for identifying the one of said record tracks being scanned by said head which comprises an indexing station exposed to illumination from said edge, light responsive means in said indexing station for providing a pulse when said mark passes said indexing station, and means coupled to said light responsive means for counting said pulses.

References Cited by the Examiner

UNITED STATES PATENTS

| | | | |
|---|---|---|---|
| 2,567,092 | 9/51 | Williams | 179—100.2 |
| 2,901,730 | 8/59 | Goddard | 340—173 |

IRVING L. SRAGOW, *Primary Examiner.*